April 23, 1935.  H. E. SATRE  1,998,591
CAISSON BORING MACHINE
Filed Feb. 24, 1931  5 Sheets-Sheet 4
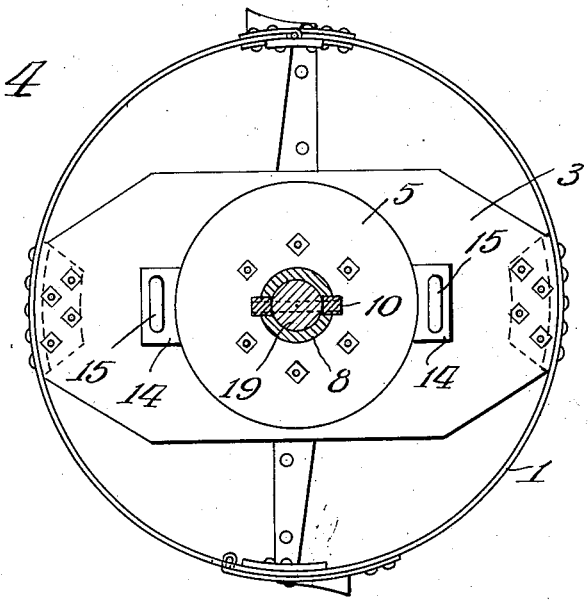
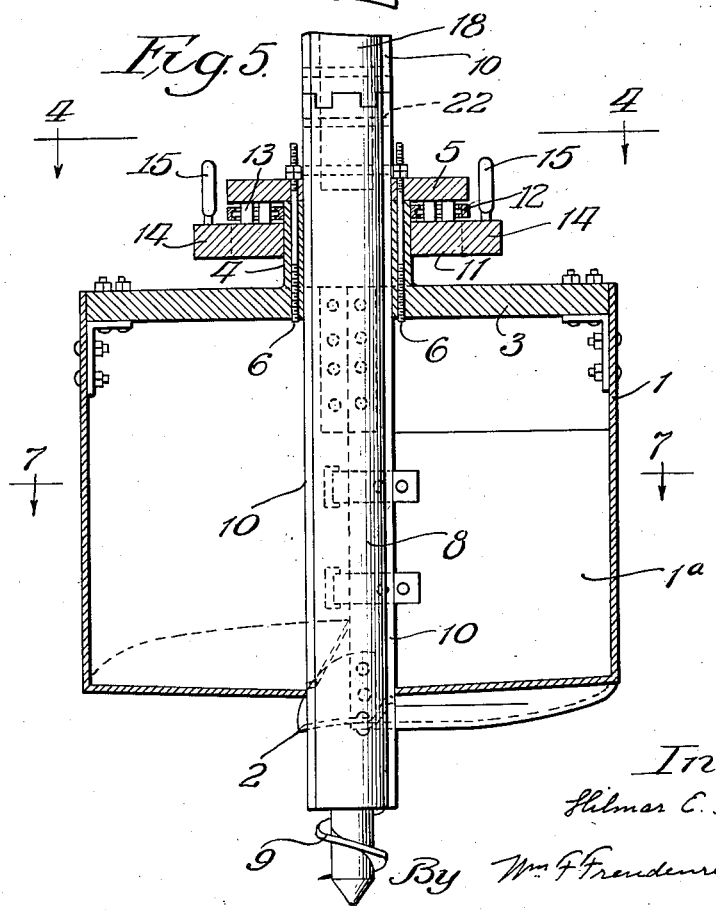

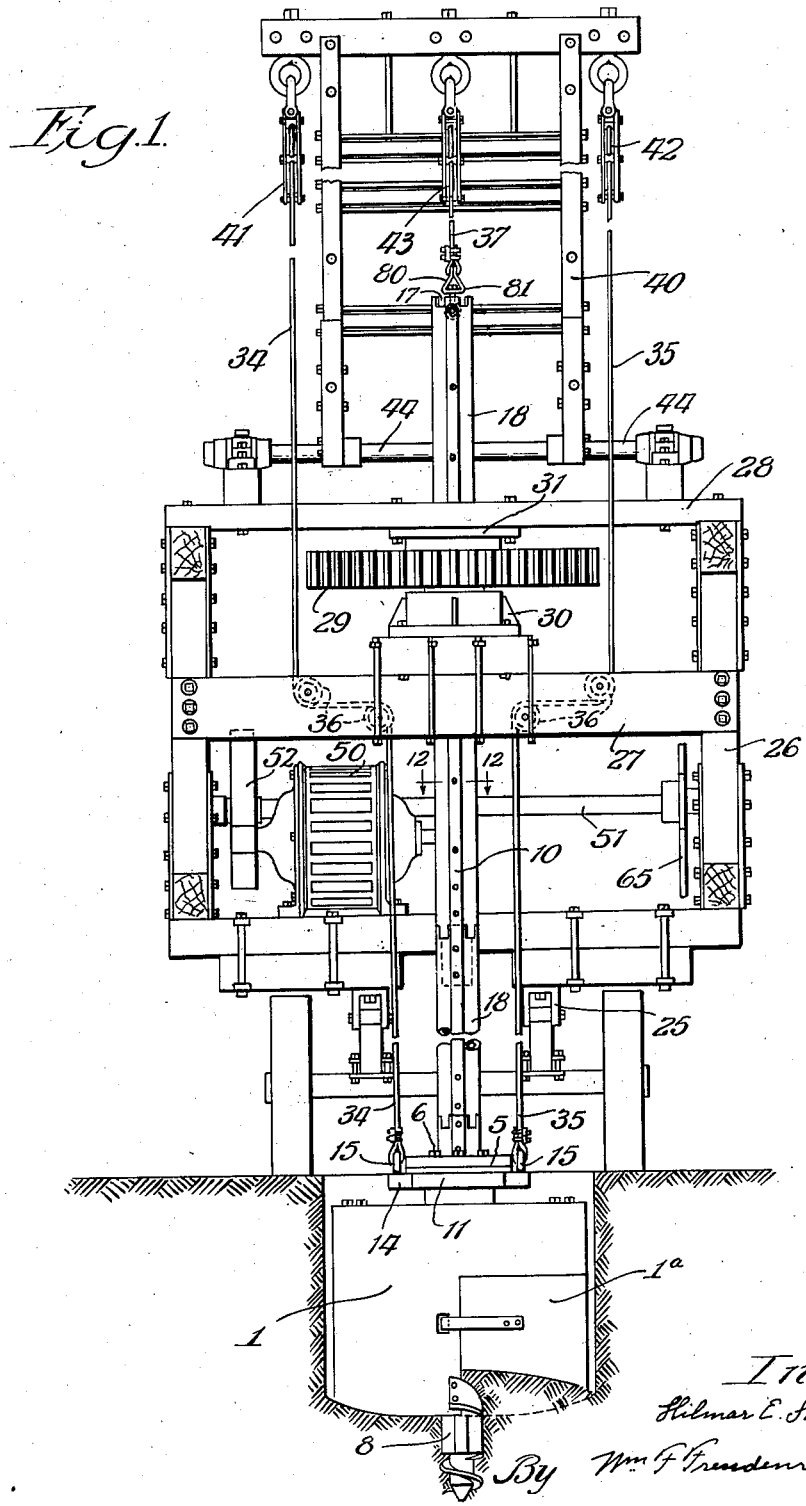

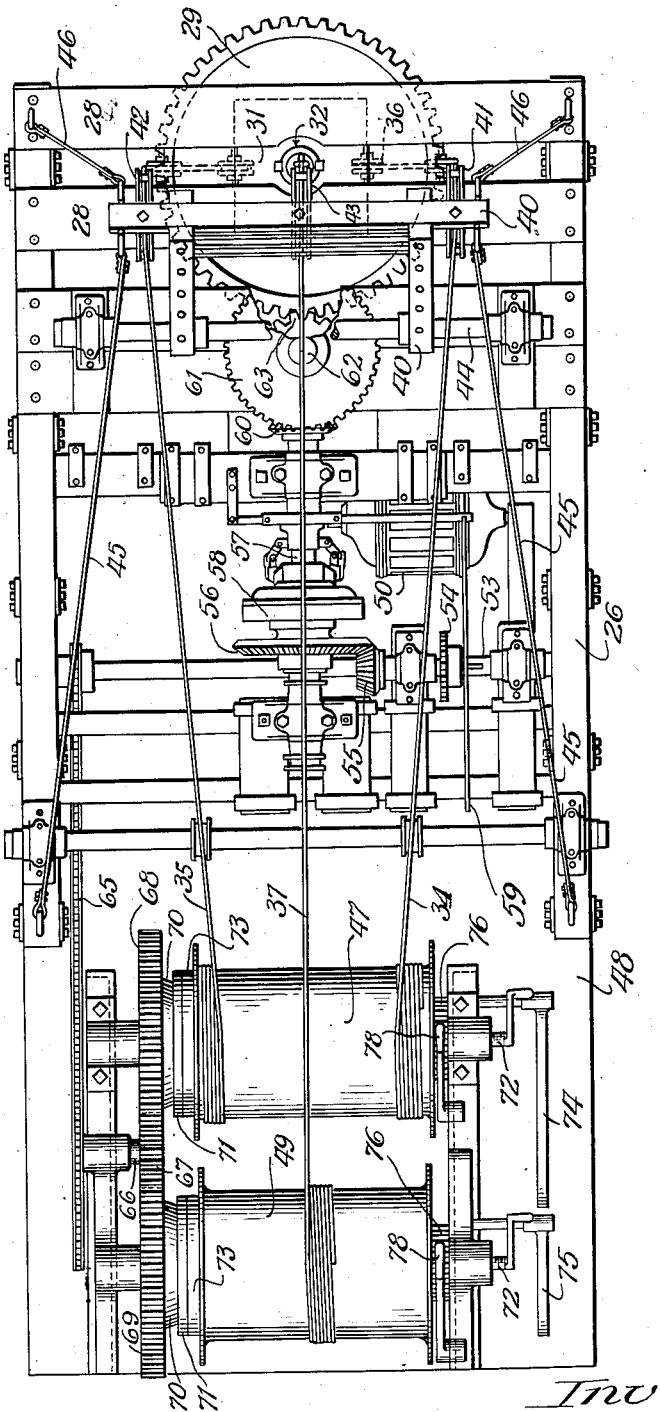

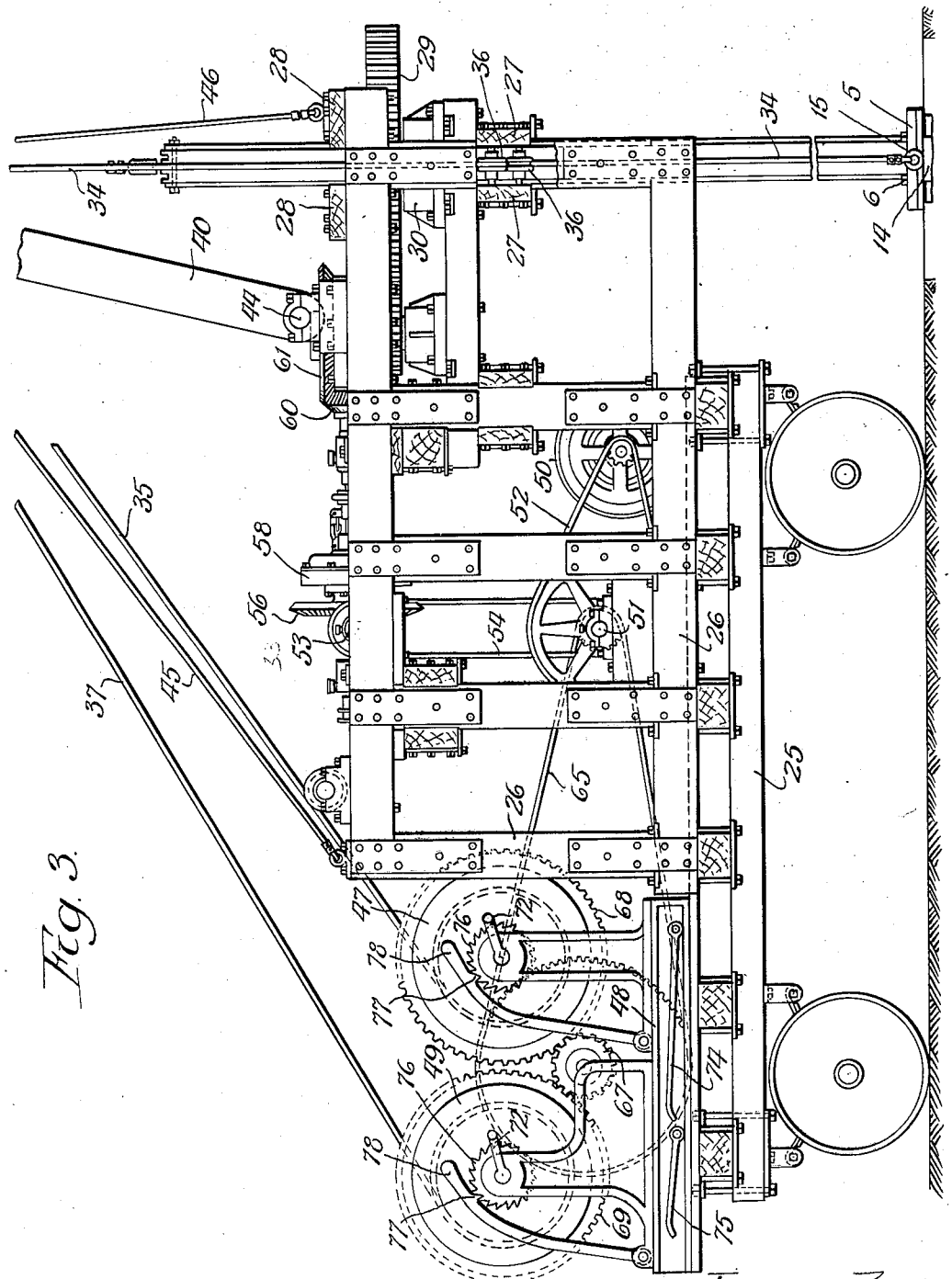

April 23, 1935. H. E. SATRE 1,998,591
CAISSON BORING MACHINE
Filed Feb. 24, 1931 5 Sheets-Sheet 5
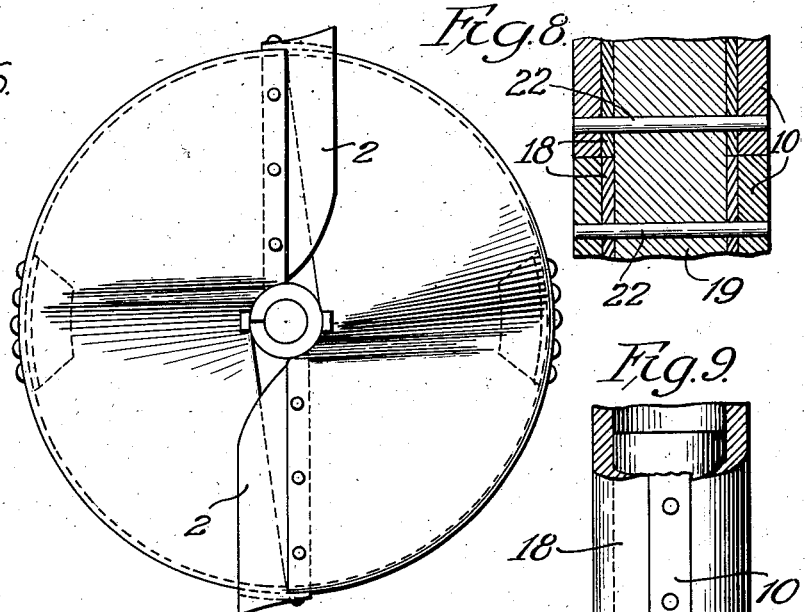
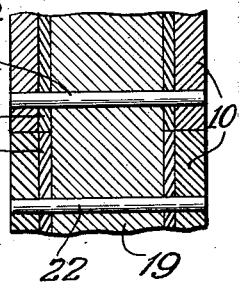
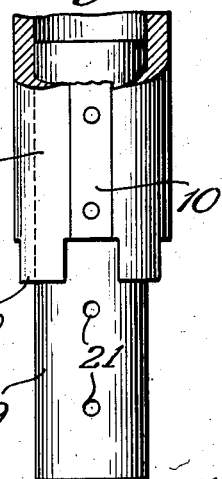
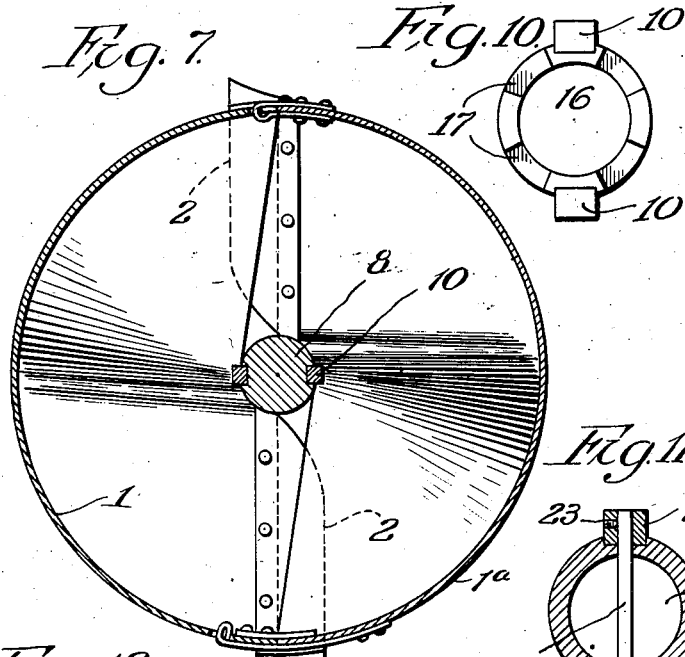
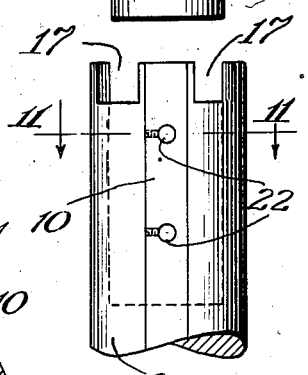
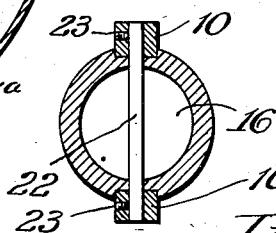
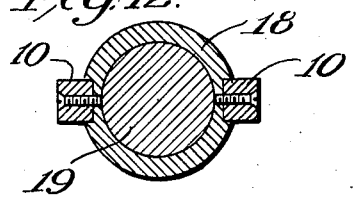

Patented Apr. 23, 1935

1,998,591

UNITED STATES PATENT OFFICE 1,998,591

CAISSON BORING MACHINE

Hilmar E. Satre, Chicago, Ill., assignor, by mesne assignments, to Spencer, White & Prentis, Incorporated, New York, N. Y., a corporation of Connecticut Application February 24, 1931, Serial No. 517,845

2 Claims. (Cl. 255—21)

The present invention has for its object to produce a simple, novel and efficient machine for boring large, deep holes, such as caissons.

A further object of the present invention is to produce a machine of the foregoing type that may easily be transported over long distances and be easily and quickly shifted from one point to another in the making of a plurality of holes near each other.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of a machine embodying the present invention, the auger being shown in a hole that has just been started; Fig. 2 is a top plan view of the machine; Fig. 3 is a side view, the upper part of the tower being broken away; Fig. 4 is a section, on a larger scale than Figs. 1 to 3, taken at right angles to the auger shaft just above the auger in its lowered position on the shaft, the section being on line 4—4 of Fig. 5; Fig. 5 is an elevation of the lower end of the auger shaft, the auger being shown thereon in section; Fig. 6 is a bottom plan view of the parts shown in Fig. 5; Fig. 7 is a section on line 7—7 of Fig. 5; Fig. 8 is a central longitudinal section through the meeting ends of two of the joints of the auger shaft; Fig. 9 illustrates the meeting ends of two sections, or joints of the auger shaft, separated from each other; Fig. 10 is a top plan view of the lower joint or section shown in Fig. 9; and Figs. 11 and 12 are sections taken, respectively, on line 11—11 of Fig. 9 and line 12—12 of Fig. 1.

In carrying out my invention, I employ an auger shaft that is made in sections or joints so as to permit it to be lengthened as the boring progresses, and a combined auger and receptacle that slides freely up and down along the shaft but is compelled to rotate therewith. Therefore, after a boring has been started, the shaft need not be lifted until the work has been completed; the bucket-like auger being simply drawn up and emptied whenever it has taken up a proper load.

The auger may take any desired form, being preferably, when in a closed or boring condition, a cylindrical bucket 1, having any suitable auger blades 2, 2 that will cause it to bore a hole of larger diameter than its own diameter and cause the excavated material to enter the bucket through the bottom. As shown, the auger has a door 1a through which it may be emptied. Across the top of the bucket is a fixed heavy bridge piece 3 having a central hub 4 rising therefrom. Lying on top of the hub is a heavy disk 5 considerably larger in diameter than the hub and fastened to the member 3 by means of bolts 6. The member 3, the hub 4, and the disk 5 have therein a central bore of a size to fit an auger shaft. The bottom of the bucket has an opening registering with the central bore in the top.

The auger shaft is made in a plurality of sections or joints; the first being the working end of point 8 in the form of a solid shaft having a small bit 9 at its lower end. The member 8 has on opposite sides projecting longitudinal keys 10, 10. The openings in the top and bottom of the bucket are enlarged at the proper points to produce keyways that receive these keys. Therefore, although the auger may slide up and down on the shaft, it is effectively interlocked with the same, so as to be compelled to rotate therewith.

The purpose of the disk 5 is to provide a table or track for a carriage to which are connected cables by means of which the auger may be hoisted. In the arrangement shown, there is underneath the disk 5 a second heavy disk 11 surrounding and loose on the hub. Between the disks 5 and 11 is a suitable annular cage 12 carrying anti-friction rollers 13, which engage with both of the disks and form an anti-friction bearing between the same. The disk 11 is provided with diametrically opposed projecting ears 14 provided with eyes 15, or other means by which the ends of two cables may be attached to what may be termed the carriage underlying the annular track fixed to the auger. It will be seen that the carriage is not required to turn while the shaft and the auger are turning, and, therefore, cables attached to the auger through the carriage will not become twisted during boring operations.

The lower section 8 of the auger shaft need only be long enough to project a short distance below and a short distance above the bucket-like auger. The upper end of this section is suitably shaped to interlock with the next section above the same. In the arrangement shown, a deep hole 16, of considerable diameter, is bored into the upper end of the member 8, and a number of notches 17 are cut into the upper edge of the tubular or sleeve-like part thus formed. The second section 18 of the shaft has a reduced lower end 19 that will fit into the hole 16 and, at the base or upper end of the part 19 of reduced diameter, are a series of teeth or projections 20 that will fit into the notches 17 in the section 8 when the two sections are brought together. The parts are so proportioned that, when two of the auger shaft sections are assembled, corresponding keys thereon will align with each other so as to form continuous guides along which the auger may be moved. The notches 17 and the teeth 20 constitute interlocks that compel the shaft sections to rotate in unison with each other. In order to prevent two sections from being pulled apart, I provide transverse pins that may readily be inserted or removed. In the arrangement shown, the reduced part of the member 18 has two holes 21, 21, extending diametrically through the same, and the member 8 has therein similar holes that will register with the holes 21. These holes are preferably so located angularly of the shaft that those in the member 8 will pass through the heavy keys. After the members 8 and 18 have been brought together, pins 22, 22 are inserted through the registering transverse holes. These pins may be secured against accidental displacement by means of set screws 23 entering the keys on the member 8 through the sides and engaging with the pins.

If desired, some or all of the shaft sections above the working end may be made of tubes, in which case each member 19 may be a separate cylindrical part half of which is surrounded by the tubular body portion of the shaft section from the end of which it projects.

It will thus be seen that I have produced a novel, extensible auger construction in which the shaft serves as a driving member for a bucket-like auger and also as a stationary vertical shaft that permits the auger to be raised and lowered so as to permit the excavated material to be collected and removed without disturbing the shaft.

In Figs. 1, 2 and 3, I have illustrated a simple and novel apparatus adapted, in cooperation with my improved boring means, to form an efficient, portable, self-contained plant for boring caissons or the like. Referring to these figures, 25 is the frame or bed of a wheeled vehicle, a trailer, for example. On this bed is mounted a rugged framework 26, which at one end overhangs the bed. The overhanging portion has heavy cross beams 27, 27 disposed considerably above the bed and, therefore, high above the ground. Above and spaced apart from the beams 27 are two cross beams 28. Between the beams 27 and 28 is a large horizontal gear wheel 29 rotatably supported by heavy castings 30 and 31 fastened to the beams 27 and 28, respectively. In the center of the gear wheel is an opening 32 shaped to fit about the auger shaft and its keys; the shaft being, therefore, free to slide up and down through but compelled to rotate with the gear.

The beams 27 are high enough above the ground to leave ample room below the same for the bucket or auger, when the latter is raised out of the ground; thereby permitting the auger to be raised and emptied whenever it has taken up a charge of earth. I have shown two cables 34 and 35, connected to the eyes 15 of the lifting carriage on the auger, these cables extending up to and over pulleys or guides 36, 36 on the beams 27.

There must also be a cable to lift the auger shaft to remove it from the hole when the latter has been completed and to lift the top section or joint from time to time, if the lengthening of the shaft is to be effected by inserting additional joints or sections directly under the top section. The cable for this purpose is indicated at 37.

All three of the cables are carried up to the top of a tower 40 rising from the overhanging part of the superstructure or framework where they pass over pulleys or sheaves 41, 42 and 43 on the tower and extend rearwardly to suitable cable reels. In the arrangement shown, the tower is in the form of a rugged flat frame mounted at its lower end on a transverse shaft 44 for swinging movements between an upright working position and a lowered or horizontal idle position. The tower may conveniently be held raised by suitable detachable guy ropes, such as 45 and 46, leading from the top of the tower to the framework behind and in front of the tower.

The cables 34 and 35 lead to and are wound upon opposite ends of a drum or cable reel 47 supported on a platform 48 at the rear end of the machine, assuming the end at which the auger is situated to be the front end; and the cable 37 extends to and is wound upon a similar drum or reel 49, also mounted on this platform. These drums or reels may be driven in any suitable manner, preferably from a motor that serves also to rotate the main driving gear 29. In the arrangement shown, there is a motor 50 which drives a transverse shaft 51 through a suitable sprocket chain and wheel drive 52. Above and parallel with the shaft 51 is a second shaft 53, driven from the shaft 51 by a sprocket chain 54. On the shaft 53 is a bevel pinion 55 meshing with a bevel gear 56 loose on a central longitudinal shaft 57. The gear 56 and the shaft 57 may be connected together by a suitable clutch 58 controlled by a clutch-shifting device, including a rod 59 that extends rearwardly to a point above the platform 48. On the forward end of the shaft 57 is a bevel pinion 60 meshing with a bevel gear 61 on the upper end of a short, vertical shaft 62. On this latter shaft, below the wheel 61, is a pinion 63 that meshes with the gear wheel 29. Therefore, when the motor is running, and the clutch is in, the driving gear will be turned, causing the auger to be rotated.

The cable drums or reels are also driven from the shaft 53, there being a sprocket chain drive 65 between this shaft and a short, transverse stub shaft 66 lying beyond one end of and midway between the cable reels. On the inner end of the stub shaft 66 is a pinion 67 arranged between and meshing with two large gear wheels 68 and 69, each adjacent to and co-axial with one of the reels. Between each of the gear wheels 68 and 69, and the corresponding drum or reel, is a clutch. These clutches may conveniently be conical friction clutches of which one member 70 is carried by the gear wheel and the other member 71 by the drum or reel. By mounting each drum or reel so that it may be shifted endwise a short distance, and providing it with a handled screw device 72 for shifting it, the drums or reels may be clutched to and unclutched from their driving gears independently of each other. On each drum or reel there may be a brake band 73, these being controlled by suitable foot pedals 74 and 75, respectively. Furthermore, each drum or wheel may have fixed thereto at one end a ratchet wheel 76 with which cooperates a holding pawl 77 on a hand lever 78. When the pawls are in engagement with the ratchet wheels, they prevent the drums or wheels from turning in a direction to unwind the cables. The clutch controls, the brake pedals, and the levers for the holding pawls are all on the same side of the machine where they can readily be manipulated by a single operator.

The operation of my improved machine will now be understood. Having drawn the machine to a location where caissons are to be dug, it is positioned so that the auger shaft will be co-axial with the bore to be made in the earth. The auger having been applied to the shaft, and the shaft and auger having been lowered until the point of the shaft has penetrated the earth, the holding pawls are thrown back so that the cables may unwind. Then, the cable drums or reels being unclutched, the motor is started and the clutch 58 is thrown in, causing the large driving gear to turn slowly. The auger device, being firmly guided, bores into the earth until the bucket-like auger becomes filled. Thereafter the drum for the lifting cables for the auger is operated, hoisting the bucket-like auger above the ground. The drum is then unclutched and is locked by its holding pawl against turning back and permitting the load to drop. The contents of the auger are then discharged and removed; the auger is again lowered into the bottom of the hole; and the cycle just described is repeated until the hole has become deep enough to require a lengthening of the auger shaft. Therefore, the auger is both a boring device and a hoist for excavated material, and the auger shaft serves at one time as a drive for the auger and at another time as a vertical guide on which the auger, acting as a hoist, runs.

As heretofore stated, the auger is preferably of the type that fashions a hole larger in diameter than itself, so that, from time to time, casing sections (not shown) may be slipped down into the hole, one upon the other. The first casing section will descend under the action of gravity until it reaches the bottom of the hole and will thereafter keep on descending, as the excavation progresses; so that the hole will always be completely lined and the vertical faces thereof braced.

In order to lengthen the auger shaft, in the first instance, the top section may be disconnected from the point or working end and be lifted so as to permit a second section to be inserted and secured; or, if desired, all of the sections except the point or working end may be similar to each other, so that, after the auger device has descended into the ground a predetermined distance, the cable is simply detached from the upper end, a shaft section is added, and the cable is then attached to the upper end of the added section. Where it is desired to leave the cable attached to the shaft while the latter is rotating, there must, of course, be a swivel connection between the cable and the shaft to avoid twisting the cable. In the arrangement shown, the lifting cable 37 has thereon a clevis 80 from which is hung, in a manner to permit it to turn freely with the shaft, an eye bolt 81. The eye in the bolt extends far enough down into the cavity 16 in the upper end of the upper shaft section to permit one of the pins 22 in the shaft to pass through the same.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a carriage, an auger shaft extending vertically through the carriage, means to rotate the shaft, an auger bucket of cylindrical form slidable lengthwise on the shaft, interlocking shoulders on the auger bucket and the shaft to cause them to rotate together, a horizontal annular track above and fixed to said auger bucket and surrounding the shaft, a member underlying the track and projecting therebeyond at diametrically opposed points, rollers between said member and the track, drums on the carriage, cables attached to the projecting ends of said member and extending to said drums, and means for rotating said drums.

2. In a machine of the character described, a movable carriage, a tower mounted upon one end of the carriage, a vertical auger shaft, a combined auger and receptacle of cylindrical form movable lengthwise of and rotatable with the shaft, a drum on the carriage, a cable extending from said drum to the top of the tower and down to the upper end of the said shaft, a swivel connection between the aforesaid cable and the upper end of the shaft, a member connected to said auger and receptacle so as to be free to rotate about the axes of said shaft relatively to the auger and receptacle, a second and a third drum on the carriage, two cables extending from the second and third drums to the top of the tower and down to points on said member on opposite sides of the shaft, the lower ends of the last mentioned cables being attached to said member, and means for rotating said drums.

HILMAR E. SATRE.